H. FRANKOWSKI AND A. HOFFMAN.
WINDSHIELD CLEANER.
APPLICATION FILED FEB. 19, 1921.
1,399,107.
Patented Dec. 6, 1921.
2 SHEETS—SHEET 1.
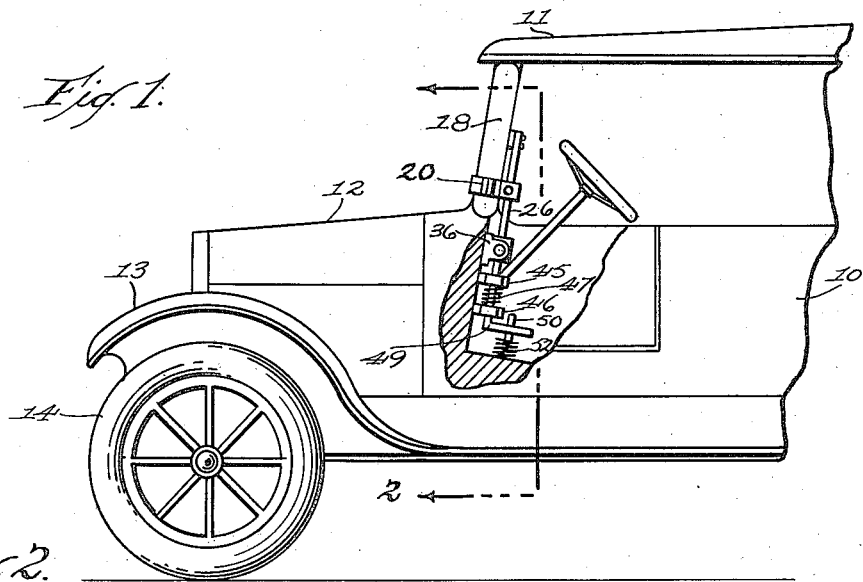
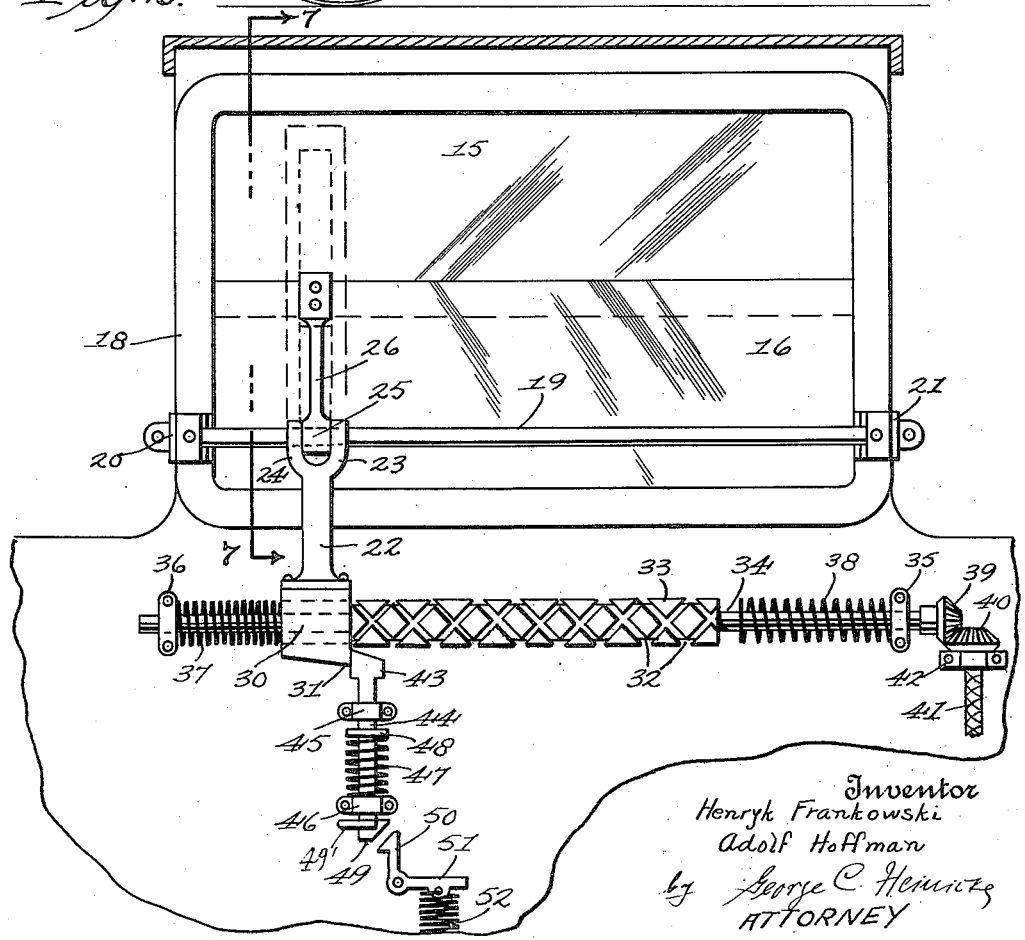
Inventor
Henryk Frankowski
Adolf Hoffman
by George C. Heinitz
ATTORNEY H. FRANKOWSKI AND A. HOFFMAN.
WINDSHIELD CLEANER.
APPLICATION FILED FEB. 19, 1921.

1,399,107.

Patented Dec. 6, 1921.

Inventor
Henryk Frankowski
Adolf Hoffman

By their Attorney
George C. Heinrichs

UNITED STATES PATENT OFFICE.

HENRYK FRANKOWSKI, OF BUFFALO, AND ADOLF HOFFMAN, OF LACKAWANNA, NEW YORK.

WINDSHIELD-CLEANER.

1,399,107. Specification of Letters Patent. Patented Dec. 6, 1921.

Application filed February 19, 1921. Serial No. 446,446.

*To all whom it may concern:*

Be it known that I, HENRYK FRANKOWSKI, a citizen of Poland, residing at Buffalo, county of Erie, and State of New York, and I, ADOLF HOFFMAN, a citizen of the United States, residing at Lackawanna, county of Erie, and State of New York, have invented certain new and useful Improvements in Windshield-Cleaners, of which the following is a specification.

This invention relates to improvements in windshield cleaners for automobiles or the like vehicles, particularly of the Ford type.

It is the principal object of the invention to produce a device of this character which automatically and systematically operates to clean the wind-shield of all moisture, rain, snow or other accumulations preventing a free outlook for the driver.

A further object of the invention is to provide a cleaner of the above type, adapted to be started and stopped at any desired moment.

These and other objects of the invention are attained by the novel construction, and combination of parts hereinafter described and shown in the accompanying drawings, forming a material part of this disclosure, and in which:—

Figure 1 is a fragmentary side view of an automobile equipped with a device constructed according to the present invention.

Fig. 2 is an inner face view of a wind-shield provided with a cleaner and its operating parts, seen along line 2—2 of Fig. 1.

Figure 5:
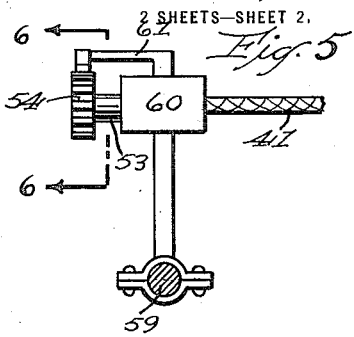
Fig. 5 is a detail view of a steering rod and parts connected therewith, the view being taken on line 5—5 of Fig. 4.
Figure 3:
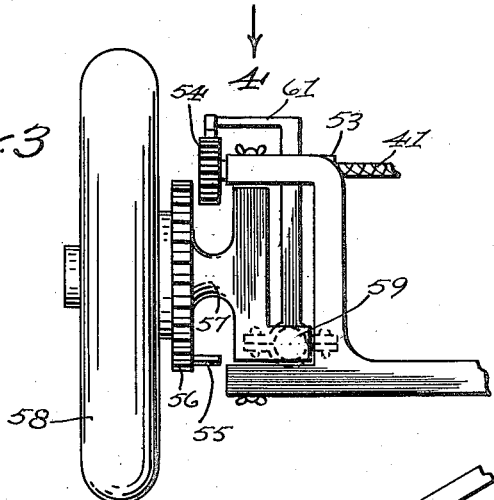
Fig. 3 is a rear view of the left hand front wheel of an automobile and parts coöperating therewith.
Figure 4:
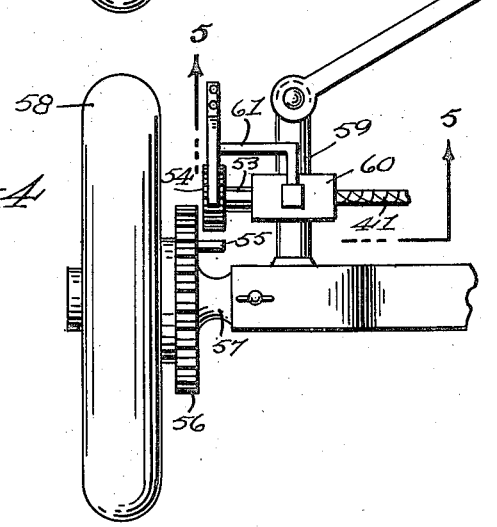
Fig. 4 is a top plan view of the parts shown in Fig. 3, seen in the direction of the arrow, Fig. 3.
Figure 6:
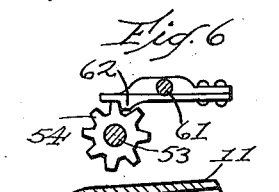
Fig. 6 is a detail side view of a control mechanism, the view being taken along line 6—6 of Fig. 5.

The automobile 10, having the customary top 11, radiator 12, mud guard 13 and front wheels 14 is provided with a wind-shield made in two parts, an upper part 15 and a lower part 16, the inner edges of which overlap each other and are spaced apart as at 17. To the frame 18 of the lower part 16 of the wind-shield, a rod 19 is clamped by means of the clamps 20 and 21 and this rod is serving as a guide for a forked bar 22 adapted to travel in longitudinal direction across the wind-shield.

Figure 7:
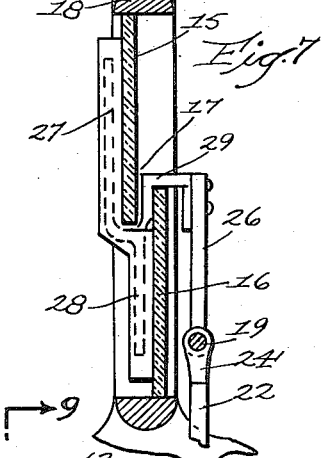
Fig. 7 is a transverse section through a wind-shield along line 7—7 of Fig. 2.

Between the forks 23 and 24 of the bar 22 the foot 25 of the holder 26 is slidably secured. This holder 26 holds the wiper elements, 27 for the upper wind-shield part, 15 and 28 for the lower wind-shield part, 16 and for this purpose its upper element 29 is guided over the upper end of the lower pane 16 and through the space 17 separating both panes 15 and 16, as best illustrated in Fig. 7.

The forked bar 22 is secured with its foot end to a block 30 provided with a lower beveled shoulder 31.

This block 30 is on its inner face provided with a double thread adapted to engage the double groove 32 on the outer face of a socket or sleeve 33 upon a horizontal shaft 34 journaled in bearings 35 and 36 secured to the front board of the automobile below the wind-shield. Between the bearing 36 and the end of the block 30, a strong spiral spring 37 is wound around the shaft 34, while another strong spring 38 is wound around the same shaft between the bearing 35 and the other end of the sleeve 33, one of the springs is tending to press the block 30 to travel in one direction upon the sleeve 33 and the other spring to press said block to travel upon said sleeve 33 in the opposite direction. Upon the outer end of the shaft 34 a bevel gear 39 is secured, which is in mesh with another bevel gear 40 upon the end of a flexible shaft 41 ending in a support 42 for said gear 40.

A stop 43 is arranged at the upper end of a bar 44, guided in suitable clamps 45, 46 secured to the front board of the automobile, and a spring 47 wound around the bar 44 between the lower guide 46 and a collar 48 has the tendency to normally push the stop 43 into engagement with the block 30. The lower end of the bar 44 is shaped into a hook 49 adapted to be engaged by a similar hook 50 at one arm of a bell-crank lever, the other arm of which is constituting a stop 51 controlled by a spring 52, while a foot operated pedal 49' effects the engagement or disengagement of the hooks 49 and 50.

The free end of the flexible shaft 41 is attached to a shaft 53 upon the outer end of which a gear 54 is located, adapted to be engaged by a pin 55 laterally projecting from the speedometer gear 56 on the front axle 57 of the automobile, carrying the wheel 58 and adapted to be controlled by the steering post 59 of the automobile, to a bracket 60 of which a holder 61 is attached for a control finger 62 engaging the gear 54 and permitting the rotation of the same for one tooth only upon its engagement by the pin 55 of the gear 56.

Figure 9:
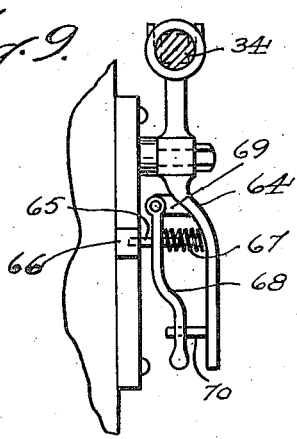
Fig. 9 is a front view thereof, along line 9—9 of Fig. 8.
Figure 8:
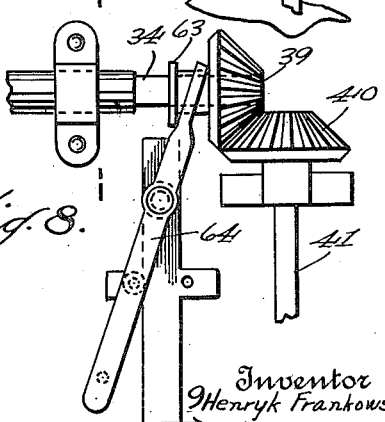
Fig. 8 shows a modified form of the cleaner operating means.

In Figs. 8 and 9 a modified form of actuating device for the shaft 34 is shown according to which the bevel gear is attached to a sleeve 63 slidably held on shaft 34, and adapted to be operated by means of a forked lever 64 to bring bevel wheel 39 into engagement with the bevel wheel 40. The lever 64 is held in this position by means of a pin 65 engaging into a suitable socket 66 in the automobile body under the action of a spring 67 wound around the pin 65 between lever 64 and a lever 68 which is pivoted at its upper end to a nose 69 of the lever 64 while its lower end is engaged by a pin 70 on lever 64.

The device operates as follows:

The actuation of the bevel wheel 40 by the flexible shaft 41, during the operation of the wheel 54 by the pin 55 of the wheel 56 will produce a permanent rotation of the shaft 34, which will have no influence upon the cleaning mechanism as long as stop 43 engages the block 40, if however the stop 43 is lowered by the operation of the pedal 49' and engagement between hooks 49 and 50, the springs 37 and 38 in conjunction with the rotating socket 33 will impart to the cleaning bar 22 a reciprocating movement across the wind-shield, the outer faces of which are operated upon and cleaned by means of the wipers 27 and 28.

Having thus described our invention, what we claim as new and desire to secure by Letters Patent of the United States is,—

1. In apparatus for reciprocating a windshield wiper of the class described, a block having an inner double thread, a shaft, a double grooved socket on said shaft, its groove adapted to be engaged by the double thread of said block, a means for changing the direction of movement of said block at each end of its path along said socket, means for imparting a rotary movement to said shaft, and means for normally stopping the movement of said block but allowing a release of the same if the wiping of the windshield becomes necessary.

2. In apparatus for reciprocating a windshield wiper of the class described, a horizontal shaft, journal bearings for said shaft, a double grooved socket on said shaft, springs wound around said shaft, between the ends of said socket and said bearings respectively, a block provided with inner double threads, adapted to engage the double groove in said socket to receive a reciprocating movement, a spring operated pedal, a stop adapted to be actuated by said pedal for releasing said block to receive its movement, and means for imparting a rotary movement to said shaft.

3. In apparatus for reciprocating a windshield wiper of the class described, a block provided with an interior double thread, a brake for said block, a horizontal shaft, a couple of bearings for said shaft, a socket on said shaft having a double grooved outer face adapted to be engaged by the inner double thread of said block, a spring wound around each end of said shaft and engaging with its free end the end of said socket, a bevel gear at one end of said shaft, a bevel gear in mesh with said first named bevel gear, a flexible shaft to which said last named bevel gear is secured, and means for transmitting rotary motion to said flexible shaft for imparting to said block and wiper means a reciprocating movement upon the release of said block by said brake.

4. In apparatus for reciprocating a windshield wiper of the class described, a block provided with an interior double thread, a brake for said block comprising a stop adapted to engage said block, a spring controlled bar by the upper end of which said stop is supported, and a hook at the lower end of said bar, said hook adapted to be engaged by a similar hook of a foot operated pedal for operating the brake, a horizontal shaft, a couple of bearings for said shaft, a socket on said shaft having a double grooved outer face adapted to be engaged by the inner double thread of said block, a spring wound around each end of said shaft and engaging with its free end the end of said socket, a bevel gear at one end of said shaft, a bevel gear in mesh with said first named bevel gear, a flexible shaft to which said last named bevel gear is secured and means for transmitting rotary motion to said flexible shaft for imparting to said block and wiper means a reciprocating movement upon the release of said block by said brake.

In testimony whereof we have affixed our signatures.

HENRYK FRANKOWSKI.
ADOLF HOFFMAN.